United States Patent [19]

Motogami et al.

[11] Patent Number: 5,118,745
[45] Date of Patent: Jun. 2, 1992

[54] METHOD FOR IMPROVING ELECTRIC CONDUCTIVITY OF A RESIN MOLDING

[75] Inventors: Kenji Motogami, Takatsuki; Shigeo Mori, Kyoto, both of Japan

[73] Assignee: Dai-Ichi Kogyo Seiyaku Co., Ltd., Kyoto, Japan

[21] Appl. No.: 577,539

[22] Filed: Sep. 5, 1990

[30] Foreign Application Priority Data

Sep. 11, 1989 [JP] Japan ................................ 1-235950

[51] Int. Cl.⁵ .................................................. C08K 5/06
[52] U.S. Cl. ...................................... 524/377; 524/378
[58] Field of Search ................................ 524/378, 377

[56] References Cited

FOREIGN PATENT DOCUMENTS 59-171A 10/1984 Japan .
223134A 9/1989 Japan .

Primary Examiner—Paul R. Michl
Assistant Examiner—Yong S. Lee
Attorney, Agent, or Firm—Morgan & Finnegan

[57] ABSTRACT

A resin molding having a very improved electric conductivity is obtained by the steps of mixing with a resin a complex of a polyether and an electrolyte salt soluble in the polyether and then molding the mixture. The polyether is selected from the group consisting of alkylene oxide polymers and copolymers, preferably selected from the group consisting of polymers of an alkylene oxide having not less than 4 carbon atoms and block or random alkylene oxide copolymers containing not less than 10 weight % of at least one alkylene oxide unit having not less than 4 carbon atoms.

4 Claims, No Drawings

METHOD FOR IMPROVING ELECTRIC CONDUCTIVITY OF A RESIN MOLDING

BACKGROUND OF THE INVENTION

This invention relates to a method for improving electric conductivity of a resin molding.

As conventional methods for improving electric conductivity of a resin molding, there are the methods in which carbon black, carbon fiber or conductive mica is milled in a resin used for molding.

However, in the conventional methods for improving electric conductivity, it is necessary, in order to substantially increase the electric conductivity, to mix a large amount of the conductive substance such as carbon black with a resin. It tends to deteriorate the physical properties of the resultant resin molding and further the resin is colored to produce such as a black resin molding. Accordingly, these problems cause difficulty in their practical uses.

The object of the present invention is to provide a method for effectively improving electric conductivity of a resin molding without the above problems, namely without deteriorating the physical properties of the resultant resin molding and coloring it.

SUMMARY OF THE INVENTION

In this invention, the electric conductivity of a resin molding is improved by mixing with a resin a complex of a specified polyether and an electrolyte salt and molding the mixture.

The method of the present invention is characterized by that a complex of a polyether selected from the group consisting of alkylene oxide polymers and copolymers with an electrolyte salt soluble in the polyether is mixed with a resin and the mixture is molded.

DETAILED DESCRIPTION OF THE INVENTION

As a resin for the resin molding according to the invention, there may be used any resin having a high surface resistance, such as polyolefin resins, e.g., polyethylene and polypropylene, ABS resin, acrylic resin, polyamide resin, polyvinyl chloride resin, polycarbonate resin, polyacetal resin and phenolic resins.

Further, as a polyether used for the complex mixed with a resin for the resin molding, there may be used any polyether selected from the group consisting of alkylene oxide polymers and copolymers as described above. Generally, polymers of an alkylene oxide having not less than 4 carbon atoms and block or random alkylene oxide copolymers containing not less than 10 weight % of an alkylene oxide unit having not less than 4 carbon atoms are preferably used, and polymers or copolymers prepared with use of alkylene oxide having at least 6 carbon atoms are most preferably used.

In general, it is preferred to use, as the polyether, one prepared by performing the polymerization reaction by using the following active hydrogen compound as the starting material; such as monoalcohols, e.g., methanol and ethanol; dialcohols, e.g., ethylene glycol, propylene glycol and 1,4-butanediol; polyhydric alcohols, e.g., glycerol, trimethylol propane, sorbitol, sucrose and polyglycerol; amine compouds, e.g., monoethanolamine, ethylenediamine, diethylenetriamine, 2-ethylhexylamine and hexamethylene diamine; and phenolic active hydrogen-containing compounds, e.g., bisphenol-A and hydroquinone. It is especially preferred to use alcohols as the starting material.

Next, as the alkylene oxides, there are preferably used those having not less than 4 carbon atoms, such as α-olefine oxides having 4 to 9 carbon atoms, e.g., 1,2-epoxybutane, 1,2-epoxypentane, 1,2-epoxyhexane, 1,2-epoxyheptane, 1,2-epoxyoctane, 1,2-epoxynonane and the like; α-olefine oxides having not less than 10 carbon atoms; styrene oxide and the like. It is especially preferred to use an α-olefine oxides having 4 to 20 carbon atoms.

The polyethers may be either of homopolymers and block or randam copolymers. The sequence of the above alkylene oxides in the polyethers is not particularly limited. But it is preferred to be block or randam copolymers of at least one alkylene oxide having not less than 4 carbon atoms and ethylene oxide and/or propylene oxide. Further, block or random copolymers of at least one alkylene oxide having not less than 6 carbon atoms and ethylene oxide and/or propylene oxide are most preferably used. In the cases, it is required to contain not less than 10 weight %, more preferably not less than 50 weight %, of at least one alkylene oxide unit having not less than 4 carbon atoms.

The molecular weight of the polyether is preferably 1,000 to 100,000. The end of the polymer may be terminated with an alkyl group such as methyl group and ethyl group.

Furthermore, as the soluble electrolyte salts used to produce a complex with the polyether, there are exemplified such as inorganic salts, e.g., lithium chloride, lithium bromide, lithium iodide, lithium nitrate, lithium perchlorate, lithium thiocyanate, sodium bromide, sodium iodide, potassium thiocyanate, potassium iodide and lithium sulfonate; and organic salts, e.g., organic sulfonates and ortanic phosphates. The added amount is preferably 0.5 to 10 weight % based on the polyether.

The used amount of the complex of the polyether and the soluble electrolyte salt is preferably 1 to 30 weight %, more preferably 1 to 10 weight % based on the resin. Though an addition of not less than 10 weight % of it is favorable for the improvement in electric conductivity, it causes deterioration of physical properties and surface bleeding disadvantageously due to the poor compatibility to the resin.

As the method for forming a complex between the polyether and the soluble electrolyte salt, a method is preferred in which the soluble electrolyte salt is previously dissolved in a single or mixed solvent highly compatible with the polyether, such as water, methanol, methyl ethyl ketone, tetrahydrofuran, acetone and methylene chloride and the solution is mixed uniformly with the polyether to give a complex solution and then the solvent is removed to give the complex.

As the method for mixing the complex between the polyether and the soluble electrolyte salt with the resin, any commonly used method can be used such as biaxial extrusion and hot rolling. As the molding method of the mixture, any commonly used method can be used such as injection molding, extrusion molding, calendering, compression molding and SMC process.

Thus in the present invention, the cation of the soluble electrolyte salt of the above-mentioned complex mixed with the resin can move through the ether oxygen in the polyether and hence ionic conductivity is formed in the resin to lower its resistance. It exerts a synergetic effect together with the decrease in surface resistance due to the plasma treatment performed after molded to provide a resistance highly suitable for electrostatic coating and enables an electrostatic coating more excellent in applicability than ever.

PREFERRED EMBODIMENTS OF THE INVENTION

The following examples serve to illustrate the inventin in more detail although the invention is not limited to the examples.

The surface resistivity in examples was measureted as follows: A voltage of 500 V was applied to the test piece with use of an ultra-insulation resistance tester (4329A type manufactured by Yokogawa Hewlett-Packard Company). and then the surface resistivity was measured after 30 seconds.

EXAMPLE 1

31 g of ethylene glycol as a starting material was put in a reactor and reacted with 1,000 g of 1,2-epoxyhexane in the presence of 3 g of potassium hydroxide as a catalyst. Then the product was purified by desalting to obtain 838 g of a polyether having a molecular weight of 1,470 (calculated from hydroxyl number) and containing 0.20 ppm of $K^-$.

A solution of 25 g of lithium perchlorate in 100 g of methanol was added to 500 g of the polyether with stirring to obtain a homogeneous solution and then methanol comprised in the solution was removed in vacuo to obtain a complex.

70 g of the complex and 1 kg of a polypropylene resin were mixed in a biaxial extruder at 180° C. for 10 min. and molded with a hot press method at the same temperature under a pressure of 50 kg/cm$^2$ for 2 min. to obtain a test piece (230 mm × 230 mm × 3 mm).

EXAMPLE 2

31 g of ethylene glycol was used as a starting material and 4,970 g of a mixture of α-olefine oxide having 6 carbon atoms and α-olefine oxide having 12 carbon atoms (molar ratio 6:4) was reacted with the starting material in the presence of 20 g of potassium hydroxide as a catalyst. Thus obtained product was purified by desalting to obtain 4,120 g of a polyether having a molecular weight of 9,020 (calculated from hydroxyl number) and containing 0.25 ppm of $K^-$.

A solution of 25 g of lithium perchlorate in 100 g of methanol was added to 500 g of the polyether with stirring to obtain a homogeneous solution and then methanol comprised in the solution was removed in vacuo to obtain a complex.

50 g of the complex and 1 kg of a polypropylene resin were mixed in a biaxial extruder at 180° C. for 10 min. and molded with a hot press method at the same temperature under a pressure of 50 kg/cm$^2$ for 2 min. to obtain a test piece (230 mm × 230 mm × 3 mm).

EXAMPLE 3

31 g of glycerin was put in a reactor as a starting material and reacted with 2,900 g of a ethylene oxide/-propylene oxide mixture (molar ratio 8:2) and then reacted with 17,100 g of α-ethylene oxide having 12 carbon atoms. The block polymerization was carried out with use of 100 g of potassium hydroxide. Thus obtained produce was purified by desalting to obtain 18,220 g of a polyether having a molecular weight of 51,190 (calculated from hydroxyl number) and containing 0.29 ppm of $K^-$.

A solution of 25 g of potassium thiocyanate in 200 g of acetone was added to 500 g of the polyether with stirring to prepare a homogeneous solution and then acetone was removed in vacuo to obtain a complex.

50 g of the complex and 1 kg of a polypropylene resin were mixed in a biaxial extruder at 180° C. for 10 min. and molded with a hot press method at the same temperature under a pressure of 50 kg/cm$^2$ for 2 min. to obtain a test piece (230 mm × 230 mm × 3 mm).

EXAMPLE 4

45 g of 1,4-butanediol was put in a reactor as a starting material. 856 g of ethylene oxide and 2,100 g of 1,2-epoxybutane were successively reacted with the starting material in the presence of 10 g of potassium hydroxide as a catalyst. The reaction product was purified by desalting to obtain 2,650 g of a polyether having a molecular weight of 5,160 (calculated from hydroxyl number) and containing 0.27 ppm of $K^-$.

A solution of 25 g of lithium perchlorate in 100 g of methanol was added to 500 g of the polyether with stirring to obtain a homogenious solution and then methanol comprised in the solution was removed in vacuo to obtain a complex.

30 g of the complex and 1 kg of a polypropylene resin were mixed in a biaxial extruder at 180° C. for 10 min. and the product was molded with a hot press method at the same temperature under a pressure of 50 kg/cm$^2$ for 2 min. to obtain a test piece (230 mm × 230 mm × 3 mm).

COMPARATIVE EXAMPLE 1

1 kg of a polypropylene resin was kneaded in a biaxial extruder at at 180° C. for 10 min. and the product was molded with a hot press method at the same temperature under a pressure of 50 kg/cm$^2$ for 2 min. to obtain a test piece (230 mm × 230 mm × 3 mm).

The surface resistivity and the tensile yield strength of the test pieces obtained in Examples 1 to 4 and Comprative Example 1 were as follows.

|  | Surface Resistivity (Ω) | Tensile Yield Strength (Kg/cm$^2$) |
| --- | --- | --- |
| Example 1 | 3.1 · 10$^{14}$ | 309 |
| Example 2 | 2.3 · 10$^{14}$ | 320 |
| Example 3 | 2.5 · 10$^{14}$ | 322 |
| Example 4 | 1.7 · 10$^{14}$ | 319 |
| Comparative Example 1 | more than 2 · 10$^{16}$ | 330 |

No substantial difference was observed in the other physical properties and appearance between the products prepared in Examples 1 to 4 and Comparative Example 1.

As described above, there can be obtained, according to this invention, a resin molding having a very improved electric conductivity without substantially affecting the color and physical properties of the resin.

What is claimed is:

1. A method for improving electric conductivity of a resin molding, characterized in that a complex of a polyether with an electrolyte salt soluble in the polyether is mixed with a resin and the mixture is molded, said polyether being selected from the group consisting of polymers of an alkylene oxide having not less than 4 carbon atoms and block or random alkylene oxide copolymers containing not less than 10 weight % of at least one alkylene oxide unit having not less than 4 carbon atoms.

and said electrolyte salt being at least one compound selected from the group consisting of lithium chloride, lithium bromide, lithium iodide, lithium nitrate, lithium perchlorate, lithium thiocyanate, sodium bromide, sodium iodide, potassium thiocyanate, potassium iodide and lithium sulfonate.

2. A method as defined in claim 1, wherein said polyether has a molecular weight of 1,000 to 100,000.

3. A method as defined claims 1 or 3, wherein said electrolyte salt is used in an amount of 0.5 to 10 weight % based on said polyether.

4. A method as defined claims 1 or 3, wherein said complex is used in an amount of 1 to 30 weight % based on said resin.

* * * * *